(12) United States Patent
Pallath

(10) Patent No.: US 10,410,340 B2
(45) Date of Patent: Sep. 10, 2019

(54) METHOD AND SYSTEM FOR MARKING CONTENT ON THE SURFACE OF AN OBJECT USING LASER

(71) Applicant: Wipro Limited, Bangalore (IN)

(72) Inventor: Sujith Krishnan Pallath, Kochi (IN)

(73) Assignee: Wipro Limited, Bangalore (IN)

( * ) Notice: Subject to any disclaimer, the term of this patent is extended or adjusted under 35 U.S.C. 154(b) by 204 days.

(21) Appl. No.: 15/463,880

(22) Filed: Mar. 20, 2017

(65) Prior Publication Data

US 2018/0253835 A1 Sep. 6, 2018

(30) Foreign Application Priority Data

Mar. 4, 2017 (IN) .............................. 201741007702

(51) Int. Cl.
| | |
|---|---|
| *G06T 7/00* | (2017.01) |
| *G06T 7/73* | (2017.01) |
| *G06T 7/11* | (2017.01) |
| *G06T 7/13* | (2017.01) |
| *G06T 3/60* | (2006.01) |
| *B41M 5/26* | (2006.01) |
| *G06T 3/00* | (2006.01) |

(52) U.S. Cl.
CPC ............. *G06T 7/001* (2013.01); *B41M 5/262* (2013.01); *B41M 5/267* (2013.01); *G06T 3/0006* (2013.01); *G06T 3/608* (2013.01); *G06T 7/11* (2017.01); *G06T 7/13* (2017.01); *G06T 7/74* (2017.01); *G06T 2207/20081* (2013.01); *G06T 2207/30108* (2013.01)

(58) Field of Classification Search
CPC ....... G06T 7/001; G06T 3/0006; G06T 3/608; G06T 7/13; G06T 7/11; G06T 7/74; G06T 2207/30108; G06T 2207/20081; B41M 5/267; B41M 5/262
See application file for complete search history.

(56) References Cited

U.S. PATENT DOCUMENTS

| | | | | |
|---|---|---|---|---|
| 4,918,611 | A * | 4/1990 | Shyu ................. | G05B 19/4205 219/121.67 |
| 8,103,085 | B1 | 1/2012 | Zadeh | |
| 2010/0017012 | A1 * | 1/2010 | Benayad-Cherif .... | B23K 26/03 700/182 |

* cited by examiner

*Primary Examiner* — Menatoallah Youssef
(74) *Attorney, Agent, or Firm* — Pepper Hamilton LLP

(57) ABSTRACT

Disclosed subject matter relates to image processing that includes a method for marking content on a surface of an object using laser. A transformation identification computing device receives an input image of the object and extracts data corresponding to region of interest in the input image. The extracted data is compared with extracted template data corresponding to regions of interest present in template images of one of one or more template objects. A transformation in position of the object with respect to the position of the one of the one or more template objects is determined, based on the comparison. Finally, an inverse of the transformation is applied to content data that is to be marked at a desired location within the region of interest of the object. The present disclosure analyses the images at a sub-pixel level based on machine learning approach to determine transformation.

18 Claims, 7 Drawing Sheets

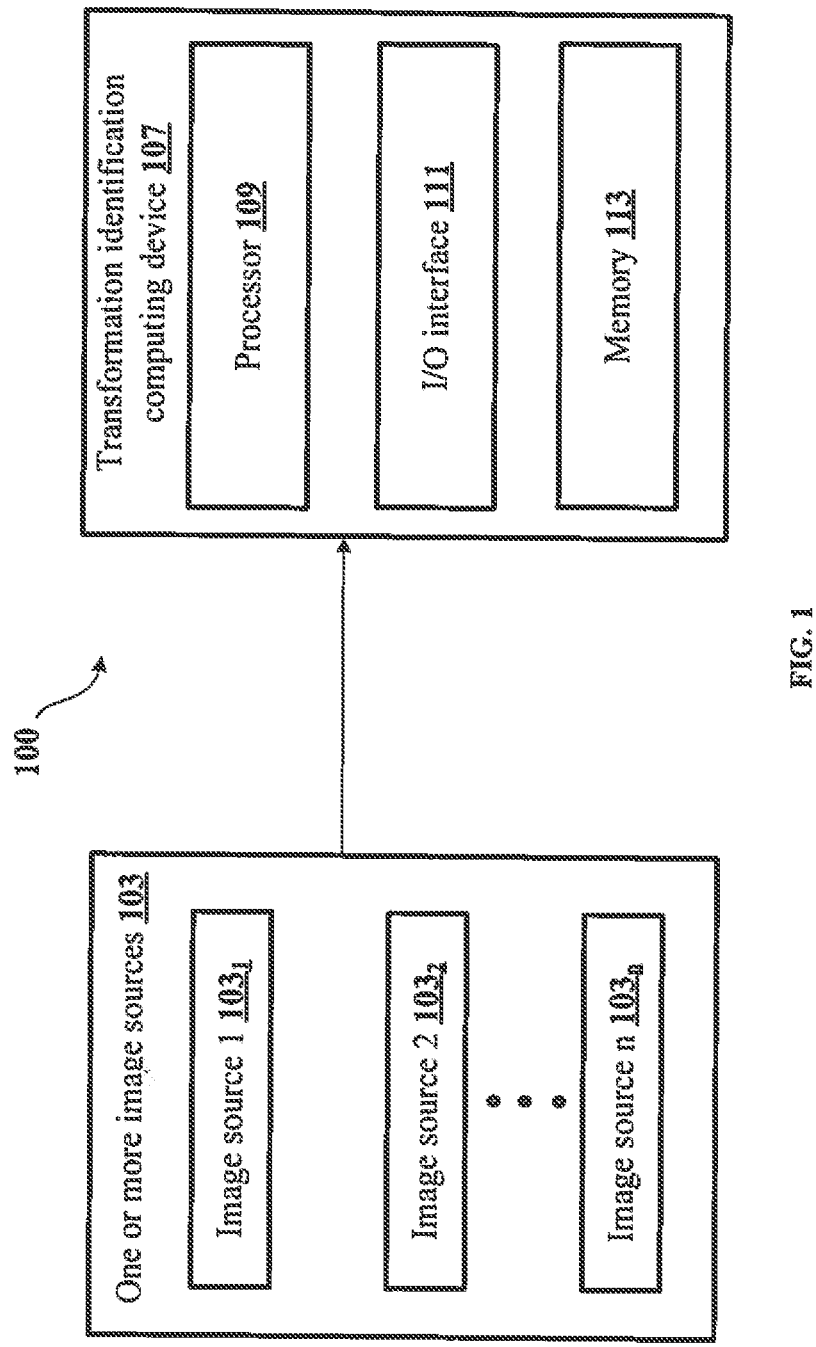

METHOD AND SYSTEM FOR MARKING CONTENT ON THE SURFACE OF AN OBJECT USING LASER

This application claims the benefit of Indian Patent Application Serial No. 201741007702, filed Mar. 4, 2017, which is hereby incorporated by reference in its entirety.

FIELD

The present subject matter relates generally to image processing, and more particularly, but not exclusively to a method and system for marking content on the surface of an object using laser.

BACKGROUND

Laser marking is a production of human and/or machine-readable identification or information on an object such as metal plate, plastic, glass, and the like. Laser marking is generally performed by laser marking machines that are provided with content to be marked and the measurements related to the content. Though, the process of marking content using laser is automated, one or more errors occur due to inaccurate placement of the object. The inaccurate placement of the object may result in transformation such as translation, rotation, skew and the like. Due to the transformation of the object on which the content is to be marked, the laser marking device may mark the content at an incorrect location instead of a desired location. The one or more errors occurring in marking the content on the object may be minute but are evident in showcasing that original content and the desired location is not achieved. This leads to waste of resources and valuable time.

Existing techniques disclose detection of flaws in position of the object on which the content is to be marked prior to marking the content on the object based on image processing. Upon detecting the flaws, a relative displacement in the position of the object is computed. However, the existing techniques compute only displacement associate with the position of the object. The position of the object may undergo transformation such as rotation and skew along with displacement which are not considered. Therefore, results of the existing techniques are not accurate, thereby not solving the problem of marking the content at the desired location even if the object is not positioned accurately.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for marking content on a surface of an object using laser. The method comprising receiving, by a transformation identification computing device, an input image of the object from one or more image sources. Upon receiving the input image, the transformation identification computing device extracts data corresponding to region of interest in the input image. Further, the transformation identification computing device compares the extracted data with extracted template data corresponding to regions of interest present in one or more template images of one of one or more template objects. The template data is extracted based on machine learning performed on the one or more template images. Furthermore, the transformation identification computing device determines transformation in position of the object with respect to position of one of the one or more template objects, based on the comparison. Finally, the transformation identification computing device, applies an inverse of the transformation to content data that is to be marked at a desired location within the region of interest of the object. The inverse of the transformation is applied prior to marking the content data.

Further, the present disclosure includes a transformation identification computing device for marking content on a surface of an object using laser. The transformation identification computing device comprising a processor and a memory communicatively coupled to the processor. The memory stores the processor-executable instructions, which, on execution, causes the processor to receive an input image of the object from one or more image sources. Upon receiving the input image, the processor extracts data corresponding to region of interest in the input image. Further, the processor compares the extracted data with extracted template data corresponding to regions of interest present in one or more template images of one of one or more template objects. The template data is extracted based on machine learning performed on the one or more template images. Furthermore, the processor determines transformation in position of the object with respect to position of one of the one or more template objects, based on the comparison. Finally, the processor applies an inverse of the transformation to content data that is to be marked at a desired location within the region of interest of the object. The inverse of the transformation is applied prior to marking the content data.

A non-transitory computer readable medium including instructions stored thereon that when processed by at least one processor causes an transformation identification computing device to perform operations comprising receiving an input image of the object from one or more image sources. Further, the instructions cause the processor to extract data corresponding to region of interest in the input image. Furthermore, the instructions cause the processor to compare the extracted data with extracted template data corresponding to regions of interest present in one or more template images of one of one or more template objects. The template data is extracted based on machine learning performed on the one or more template images. Further, the instructions cause the processor to determine transformation in a position of the object with respect to position of the one of the one or more template objects, based on the comparison. Finally, the instructions cause the processor to apply an inverse of the transformation to content data that is to be marked at a desired location within the region of interest of the object, wherein the inverse of the transformation is applied prior to marking the content data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1 shows an exemplary architecture illustrating process for marking content on a surface of an object using laser in accordance with some embodiments of the present disclosure;

Figure 2A:
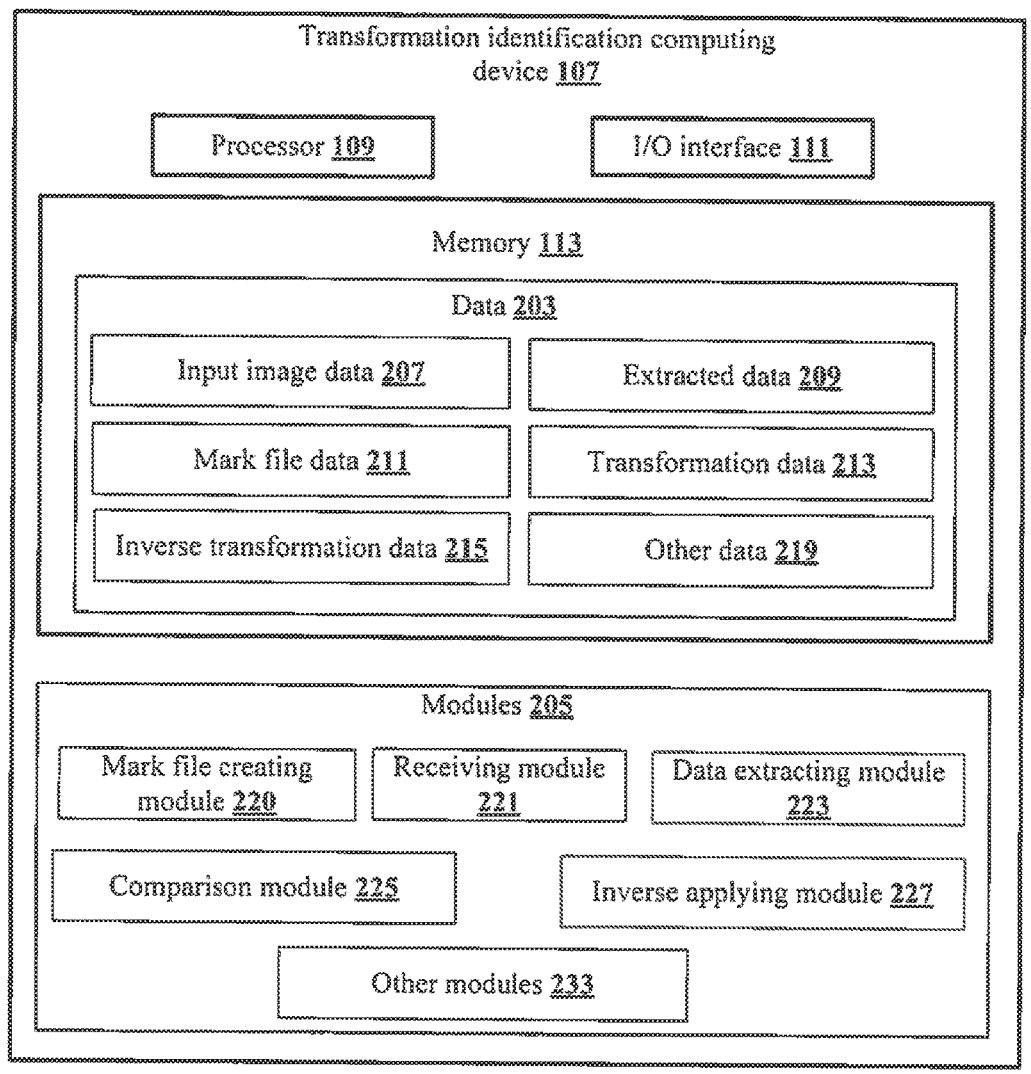
FIG. 2A shows a detailed block diagram of a transformation identification computing device for marking content on a surface of an object using laser in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method and system for marking content on the surface of an object using laser. The transformation identification computing device receives an input image of the object from one or more image sources. Upon receiving the input image, the transformation identification computing device extracts data corresponding to region of interest in the input image based on machine learning approach. Further, the transformation identification computing device compares the extracted data with extracted template data corresponding to regions of interest present in one or more template images of one of one or more template objects. The template data is extracted based on machine learning performed on the one or more template images. The extracted data and the template data comprise information related to at least one of edges and/or contours of the object and the one or more template objects, respectively. The present disclosure stores only the data corresponding to the region of interest in the form of vectors and measurements in a mark file of a predefined format instead of storing the entire image. Furthermore, the transformation identification computing device determines transformation in position of the object with respect to the position of one of the one or more template objects, based on the comparison. As an example, the transformation may include, but not limited to, a translation, a rotation and a skew. Finally, the transformation identification computing device, applies an inverse of the transformation to content data that is to be marked at a desired location within the region of interest of the object. The inverse of the transformation is applied prior to marking the content data. The present disclosure is capable of performing an intelligent machine learning approach to select the regions of interest in input image and template images for analysis. This allows the transformation indication computing device to be extremely flexible and focus only on the regions of interest. Further, the transformation indication computing device enables content marking on a desired location even if the object is moved/rotated.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for marking content on a surface of an object using laser in accordance with some embodiments of the present disclosure.

The architecture 100 includes one or more image sources, image source 1 103$_1$ to image source n 103$_n$ (collectively referred to as one or more image sources 103) and a transformation identification computing device 107. As an example, the one or more image sources 103 may include, but are not limited to, an image repository and an image capturing device such as a camera, a mobile, a tablet and the like. As an example, the image capturing device may be at least one of a monochrome image capturing device and a color image capturing device. The transformation identification computing device 107 interacts with the one or more image sources 103 via a communication network (not shown in the FIG. 1). The communication network may be at least one of a wired communication network and a wireless communication network.

The transformation identification computing device 107 includes a processor 109, an input/output (I/O) interface 111 and a memory 113. The I/O interface 111 receives an input image of an object from the one or more image sources 103. As an example, the object may include, but not limited to, a metallic object such as an aluminum plate, iron plate and the like and a non-metallic object such as a plastic plate, a wooden plate, a glass and the like. The processor 109 extracts data corresponding to a region of interest in the input image. As an example, the region of interest may be edges of the input image, contours of the input image, central region of the input image and the like. Upon extracting the data, the processor 109 compares the extracted data with extracted template data at a sub-pixel level. The extracted template data corresponds to regions of interest present in one or more template images of one of one or more template objects. As an example, the extracted data and the template data may include, but not limited to, information related to at least one of edges and/or contours of the object and the one or more template objects respectively. In an embodiment, the one or more template objects are objects placed at accurate positions for marking content data prior to actual marking of the content data. In an embodiment, the content data comprises vectors and content attributes corresponding to a content to be marked on a surface of the one or more template objects. Further, the processor 109 may extract the template data required for comparison based on machine learning performed on the one or more template images of one of the one or more template objects using one or more image processing algorithms. As an example, the one or more image processing algorithms may be based on, but not limited to, a Matrox Imaging Library (MIL) blob analysis, an image calibration operation, an image edge finder algorithm, a geometric model finder algorithm measurement, metrology, and/or one or more pattern matching operations. Further to the comparison, the processor 109 may determine transformation in position of the object with respect to position of the one of the one or more template objects. As an example, the transformation may include, but not limited to, a translation, a rotation and a skew. Upon determining the transformation, the processor 109 may apply an inverse of the transformation to the content data prior to marking the content data. The inverse of the transformation may allow marking the content data at a desired location within the region of interest of the object though there exists the transformation in the position of the object. Therefore, to mark the content data at the desired location, the processor 109 realigns a laser head of a laser marking device associated with the transformation identification computing device 107 based on the inverse of the transformation applied to the content data by the processor 109.

FIG. 2A shows a detailed block diagram of the transformation identification computing device for marking content on a surface of an object using laser in accordance with some embodiments of the present disclosure.

In some implementations, the transformation identification computing device 107 includes data 203 and modules 205. As an example, the data 203 is stored in the memory 113 configured in the transformation identification computing device 107 as shown in the FIG. 2A. In one embodiment, the data 203 includes an input image data 207, an extracted data 209, a mark file data 211, a transformation data 213, an inverse transformation data 215 and other data 219. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 219 may store data, including temporary data and temporary files, generated by the modules 205 for performing the various functions of the transformation identification computing device 107.

In some embodiments, the data stored in the memory 113 is processed by the modules 205 of the transformation identification computing device 107. The modules 205 may be stored within the memory 113. In an example, the modules 205 communicatively coupled to a processor 109 configured in the transformation identification computing device 107, may also be present outside the memory 113 as shown in FIG. 2A and implemented as hardware. As used herein, the term modules refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a mark file creating module 220, a receiving module 221, a data extracting module 223, a comparison module 225, an inverse applying module 227 and other modules 233. The other modules 233 may be used to perform various miscellaneous functionalities of the transformation identification computing device 107. It will be appreciated that such aforementioned modules 205 may be represented as a single module or a combination of different modules.

In some embodiments, the mark file creating module 220 may create a mark file for each of the one or more template objects. Each mark file includes the template data corresponding to one of the one or more template objects and a content data to be marked on the surface of one of the one or more template objects. In an embodiment, the template data comprises information related to at least one of edges and/or contours of the one or more template objects corresponding to regions of interest in one or more template images corresponding to the one or more template objects. As an example, the region of interest may be edges, contours, central region and the like. Further, the content data comprises vectors and content attributes corresponding to a content to be marked on the surface of the one or more template objects. As an example, the content attributes may include pixel intensity, color and the like. In some embodiments, the mark file is created to train the transformation identification computing device 107 with extreme accuracy for performing machine learning. The mark file having a predefined format for each of the one or more template objects may be stored as the mark file data 211. As an example, the predefined format may be an XML format and the like.

The mark file creating module 220 may create the mark file by initially receiving the one or more template images of the one or more template objects. The one or more template images are received from one or more image sources 103. The one or more template images are of the one or more template objects placed with extreme accuracy with respect to measurements. The placement of the one or more template objects ensures that correct edges of the one or more template objects are captured in the one or more template images. Further, the mark file creating module 220 receives the content data for each of the one or more template objects. In an embodiment, the content data may be at least one of pre-stored in the memory 113 or dynamically created. The content data received by the mark file creating module 220 is pre-inspected.

Upon receiving the one or more template images and the content data, the mark file creating module 220 may select the regions of interest in the one or more template images. Further, the data extracting module 223 may extract the template data corresponding to the regions of interest based on analysis of contours of each of the one or more template objects present in each of the one or more template images. In some embodiments, the analysis of contours of each of the one or more template objects may be performed using one or more image processing algorithms. As an example, the one or more image processing algorithms may be based on, but not limited to, Matrox Imaging Library (MIL) blob analysis, an image calibration operation, an image edge finder algorithm, a geometric model finder algorithm measurement, metrology, and/or one or more pattern matching operations. The extracted template data may be stored in the form of vectors. Further, the mark file creating module 220 creates the mark file having the predefined format by storing the template data along with the content data in the mark file. The mark file thus created may be transmitted to a laser marking device associated with the transformation identification computing device 107 for marking the content data on a surface of an object using laser. In a non-limiting embodiment, the content data may be marked on the object using a technology other than laser. Therefore, the analysis may be performed with respect to one laser marking machine to create the mark file and the same mark file could be used across similar laser marking machines for marking the content data on a desired location on the surface of the object.

Figure 2B:
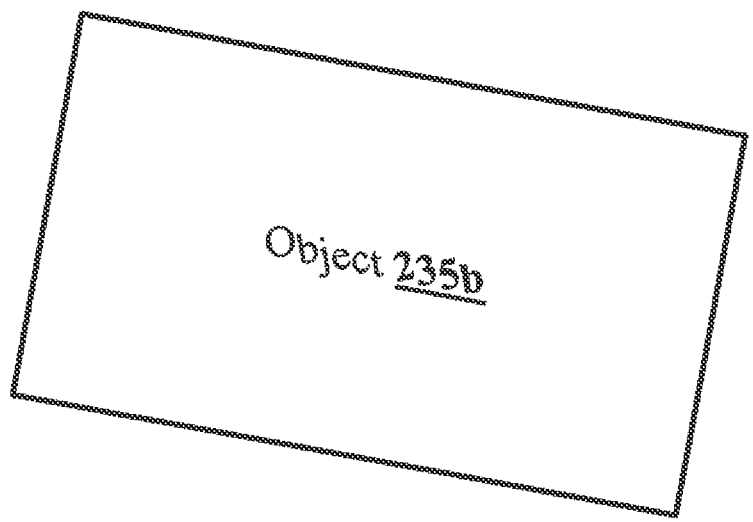
FIG. 2B-FIG. 2F show exemplary images illustrating an exemplary scenario for marking content on a surface of an object using laser with some embodiments of the present disclosure.

In some embodiments, the receiving module 221 receives an input image of the object from the one or more image sources 103. The input image received may be stored in the input image data 207. As an example, the object may include, but not limited to, a metallic object such as an aluminum plate, iron plate and the like and a non-metallic object such as a plastic plate, a wooden plate, a glass and the like. An exemplary input image of an object 235*b* is as shown in FIG. 2B. The FIG. 2B shows a rectangular metal plate as the object 235*b*.

In some embodiments, the data extracting module 223 may extract the data from the input image. The data extracting module 223 selects the region of interest in the input image. Upon selecting the region of interest, the data extracting module 223 analyses contours corresponding to the region of interest using the one or more image processing algorithms at sub-pixel level to extract the data and stores as the extracted data 209. In an embodiment, the extracted data 209 may include information related to at least one of edges and/or contours of the object corresponding to the region of interest in the input image.

In some embodiments, the comparison module 225 may compare the extracted data with the extracted template data. The comparison module 225 obtains the template data required for the comparison based on machine learning approach. By performing the machine learning approach, the mark file of one of the one or more template objects is created. In an embodiment, the one of the one or more template objects selected for the comparison may be identical to the object in the input image in terms of dimensions, the content data to be marked and the like. Upon selecting the mark file associated with one of the one or more template objects, the template data present in the selected mark file is extracted for the comparison. Upon obtaining the template data, the comparison module 225 compares the extracted data of the object with the template data of the selected template object. Based on the comparison, the comparison module 225 determines transformation in position of the object with respect to the position of the selected template object. The transformation of the object determined by the comparison module 225 is stored as the transformation data 213. As an example, the transformation may include, but not limited to, a translation, a rotation and a skew. As an example, consider co-ordinates of a corner of the object is (x,y). If the object undergoes a translation of (tx,ty), then the transformation of the object with respect to translation is (x+tx, y+ty).

In some embodiments, the inverse applying module 227 may apply inverse of the transformation to the content data. Upon determining the transformation, the inverse applying module 227 determines the inverse of the transformation. The inverse of the transformation is applied to the content data and stored as the inverse transformation data 215. Based on the inverse of the transformation applied to the content data, a laser head of the laser marking device realigns, thereby marking the content data at the desired location on the surface of the object which is transformed.

Henceforth, the process of marking the content data on the surface of the object using the laser is explained with the help of one or more examples for better understanding of the present disclosure. However, the one or more examples should not be considered as limitation of the present disclosure.

Figure 2C:
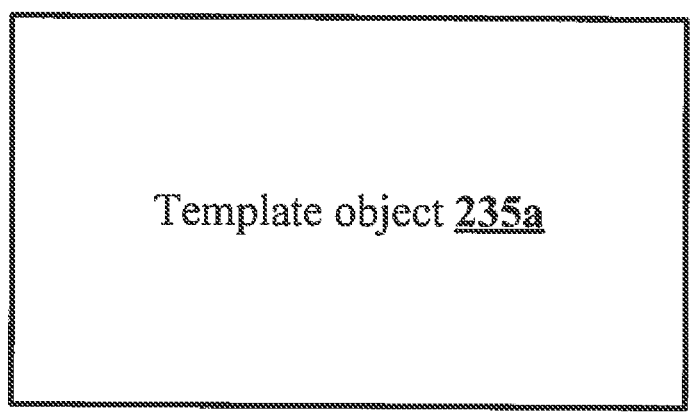
Figure 2D:
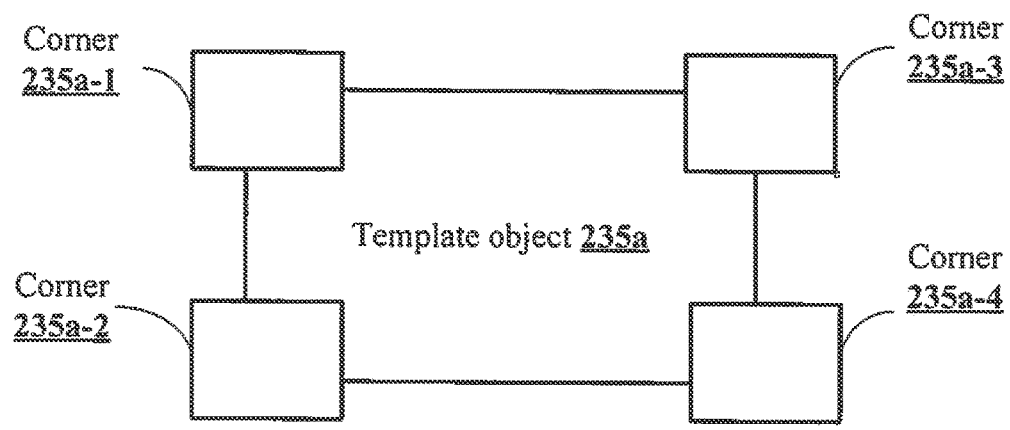

Consider an exemplary template object 235*a* placed with extreme accuracy as shown in the FIG. 2C. Further, consider one or more template images of the template object 235*a* are received from an image capturing device such as a camera. In an embodiment, the regions of interest selected in the one or more template images are corners (corner 235*a*-1, 235*a*-2, 235*a*-3 and 235*a*-4) of the template object 235*a* as shown in the FIG. 2D. Further, by using the one or more image processing algorithms, template data corresponding to the regions of interest is extracted. Furthermore, the content data comprising vectors and content attributes corresponding to a content to be marked on the surface of the template object 235*a* is received by the transformation identification computing device 107. The content data and the template data are stored together to form a mark file. The mark file comprises a predefined format such as an XML format. The transformation identification computing device 107 is trained using the mark file to perform machine learning in real-time.

Figure 2E:
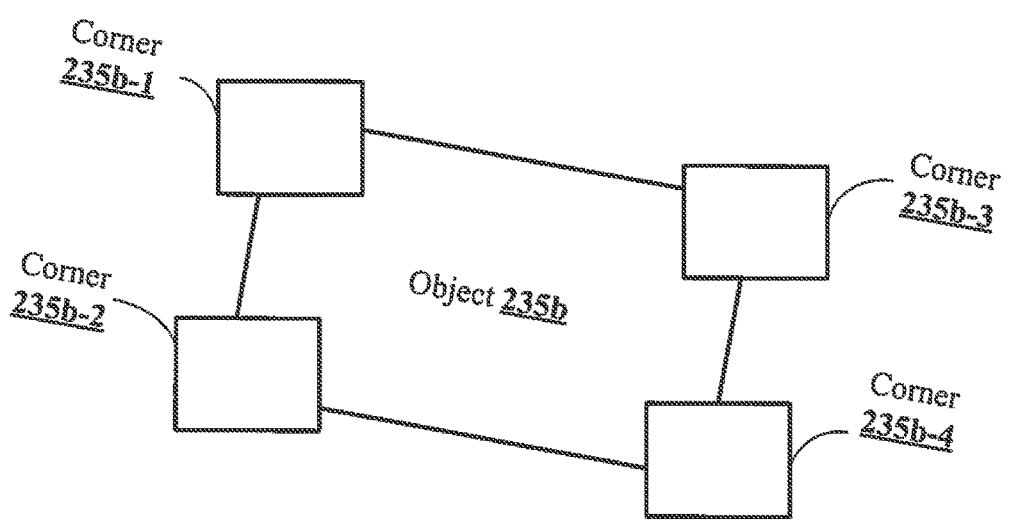
Figure 2F:
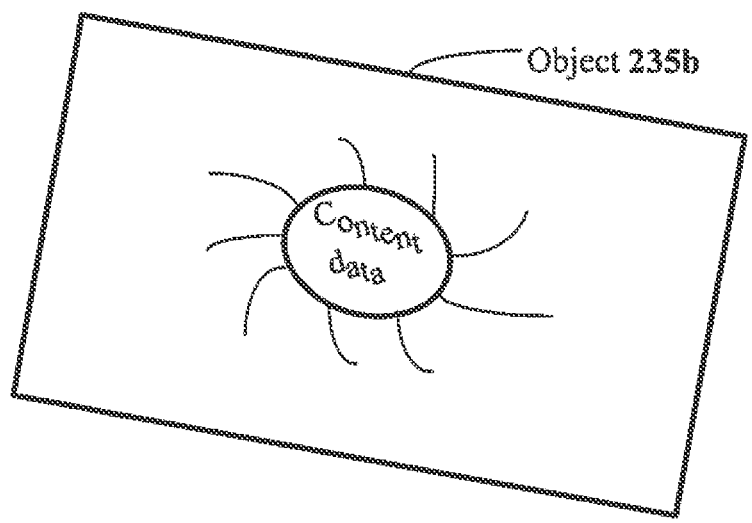

Consider the laser marking device associated with the transformation identification computing device 107 receives the mark file for marking the content data on an exemplary object 235*b* as shown in the FIG. 2B. According to the content data in the mark file, consider that the desired location where the content data should be marked is exactly at the center of the object 235*b*. Therefore, prior to marking the content data, the transformation identification computing device 107 receives an input image of the object 235*b* to check if the object 235*b* is placed accurately. The regions of interest selected in the object 235*b* images are corners (corner 235*b*-1, 235*b*-2, 235*b*-3 and 235*b*-4) of the object 235*b* as shown in the FIG. 2E. Data corresponding to the regions of interest is extracted using the one or more image processing algorithms. The transformation identification computing device 107 obtains the template data apt for comparison with the extracted data by the machine learning approach. The extracted data of the object 235*b* is compared with the template data to determine transformation in the position of the object 235*b* with respect to the position of the template object 235*a*. The transformation determined provides measurement of translation, rotation and skew of the object 235*b* that occurred due to wrong placement of the object 235*b*. An inverse of the transformation determined is applied to vectors of the content data and the laser head of the laser marking device is realigned to the new vectors obtained by applying the inverse of the transformation. The content data comprising the new vectors is marked accordingly on the object 235b to mark the content data on the desired location using the laser as shown in the FIG. 2F.

Figure 3:
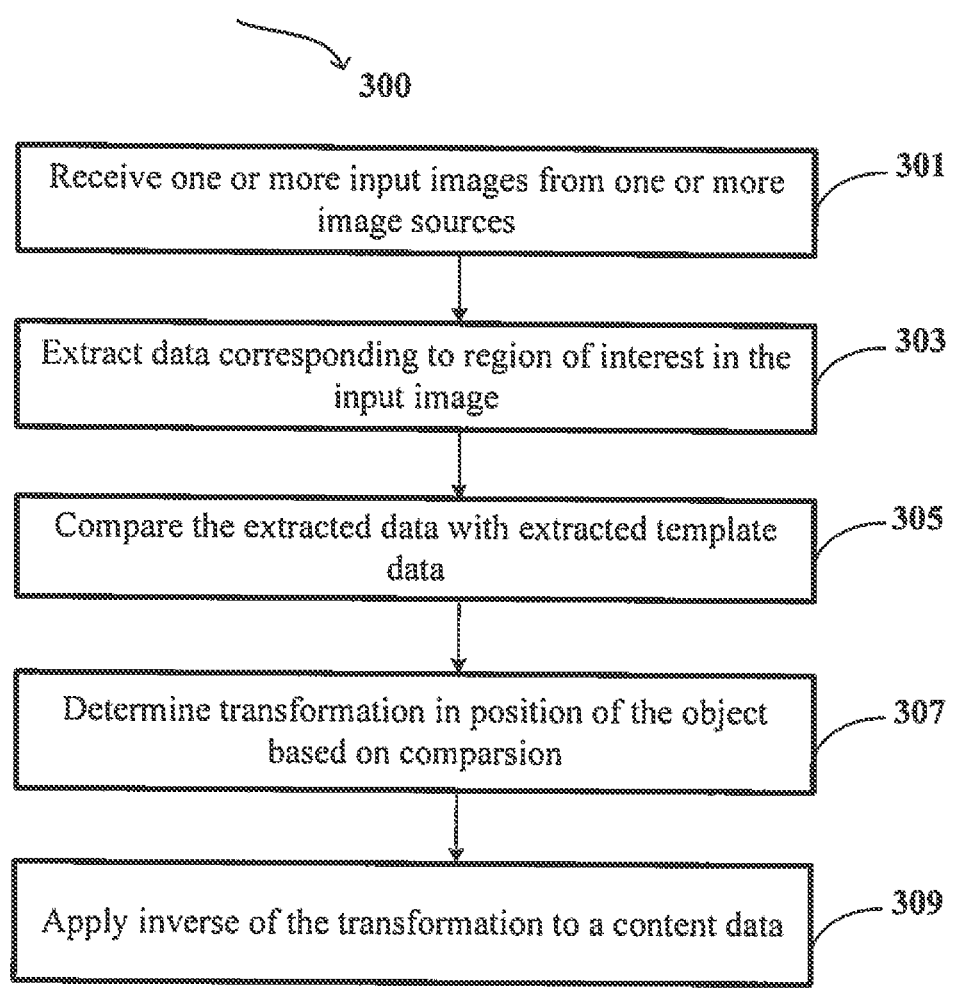
FIG. 3 shows a flowchart illustrating a method for marking content on a surface of an object using laser in accordance with some embodiments of the present disclosure.

FIG. 3 shows a flowchart illustrating a method for marking content on a surface of an object using laser in accordance with some embodiments of the present disclosure.

As illustrated in FIG. 3, the method 300 includes one or more blocks illustrating a method for marking content on a surface of an object using laser. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes receiving, by a processor 109 of the transformation identification computing device 107, an input image of an object from one or more image sources. As an example, the one or more image sources 103 may include, but not limited to, an image repository and an image capturing device such as a camera, a mobile, a tablet and the like.

At block 303, the method 300 includes extracting, by the processor 109, extracting data from the input image. The processor 109 analyses contours corresponding to a region of interest in the input image using one or more image processing algorithms to extract the data. As an example, the region of interest may be edges, contours, central region and the like.

At block 305, the method 300 includes, comparing, by the processor 109, the extracted data with extracted template data corresponding to regions of interest present in one or more template images of one of one or more template objects. In an embodiment, the template data is extracted based on machine learning performed on the one or more template images.

At block 307, the method 300 includes, determining, by the processor 109, transformation in a position of the object with respect to position of the one of the one or more template objects, based on the comparison. As an example, the transformation may include, but not limited to, a translation, a rotation and a skew.

At block 309, the method 300 includes, applying, by the processor 109, an inverse of the transformation to content data that may be marked on surface of the object at a desired location within the region of interest of the object. In an embodiment, the inverse of the transformation is applied to the content data prior to marking the content data on the object.

Figure 4:
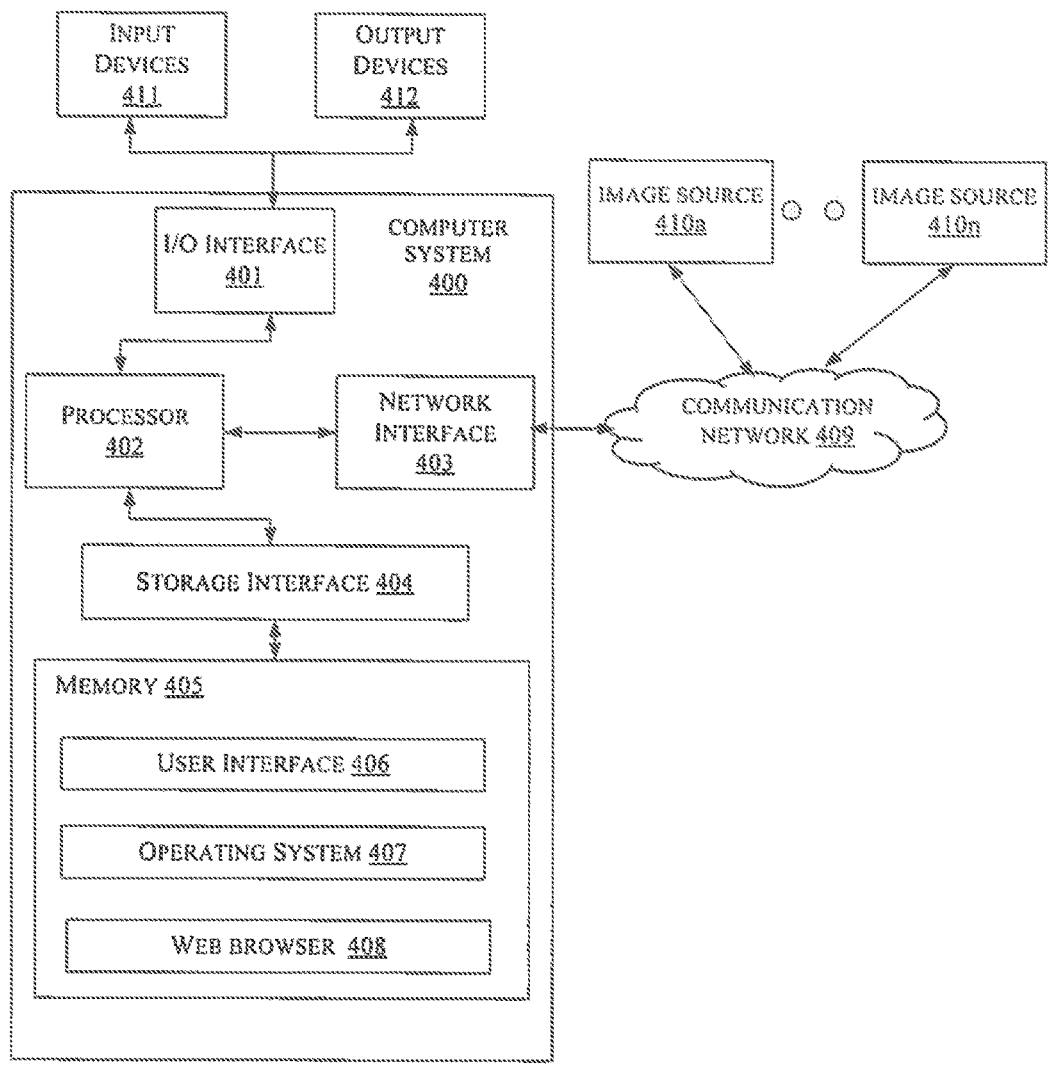
FIG. 4 is a block diagram of an exemplary computer computing device for implementing embodiments consistent with the present disclosure.

FIG. 4 is a block diagram of an exemplary computing device for implementing embodiments consistent with the present disclosure.

In an embodiment, FIG. 4 illustrates a block diagram of an exemplary computing device 400 for implementing embodiments consistent with the present invention. In an embodiment, the computing device 400 can be transformation identification computing device 107 that is used for marking content on a surface of an object using laser. The computing device 400 may include a central processing unit ("CPU" or "processor") 402. The processor 402 may include at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computing device 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computing device 400 may communicate with one or more image sources 410(a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more image sources 410(a, . . . , n) may include, but not limited to, a an image repository and an image capturing device such as a camera, a mobile, a tablet etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computing device 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computing device 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computing device 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computing device 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computing device 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft. NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computing device 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In an embodiment, the present disclosure provides a method and a system for marking content on a surface of an object using laser.

The present disclosure includes a machine learning approach for selecting regions of interest in input image and template images for analysis. This makes transformation indication computing device used in the present disclosure to be extremely flexible and focus only on the regions of interest.

The present disclosure a method which stores only the data corresponding to the region of interest in the form of vectors and measurements in a file of a predefined format instead of storing the entire image. Further, this data file is stored along with content data to obtain a mark file of the predefined format. Therefore, the analysis may be performed in one laser marking machine to create the mark file and the same mark file could be used across various laser marking machines for marking the content data on a desired location on the surface of the object.

The present disclosure provides a feature wherein the analysis is performed at a sub-pixel level accuracy. Therefore, transformation comprising translation, rotation and skew identified in position of the object is accurate.

The present disclosure provides a feature wherein the transformation identification computing device is capable of automatically determining inverse of the transformation and applying to the content data for accurate marking of the content data.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for marking content on a surface of an object using laser. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having,"

"containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method for marking content on a surface of an object using a laser, the method comprising:
    receiving, by a transformation identification computing device, an input image of the object from one or more image sources;
    extracting, by the transformation identification computing device, data corresponding to a region of interest in the input image;
    comparing, by the transformation identification computing device, the extracted data with extracted template data corresponding to regions of interest present in one or more template images of one of one or more template objects, wherein the template data is extracted from a mark file of the one of one or more template objects that is created based on machine learning performed on the one or more template images;
    determining, by the transformation identification computing device, a transformation in a position of the object with respect to a position of the one of the one or more template objects, based on the comparison, wherein the transformation comprises at least one of a translation, a rotation, and a skew; and
    applying, by the transformation identification computing device, an inverse of the transformation to content data that is to be marked at a desired location within the region of interest of the object, wherein the inverse of the transformation is applied prior to marking the content data.

2. The method as claimed in claim 1 further comprising:
    realigning, by the transformation identification computing device, a laser head of a laser marking device associated with the transformation identification computing device based on the inverse of the transformation for marking the content data at the desired location.

3. The method as claimed in claim 1, wherein the template data is obtained by:
    receiving, by the transformation identification computing device, the one or more template images of the one or more template objects along with the content data, wherein the content data comprises vectors and content attributes corresponding to a content to be marked on a surface of the template object;
    extracting, by the transformation identification computing device, the template data corresponding to the regions of interest, based on analysis of contours of each of the one or more template objects present in each of the one or more template images using one or more image processing algorithms; and
    storing, by the transformation identification computing device, the template data along with the content data in the mark file having a predefined format.

4. The method as claimed in claim 3, wherein the mark file is transmitted to a laser marking device associated with the transformation identification computing device for marking the content data on the object.

5. The method as claimed in claim 3, wherein the one or more image processing algorithms are based on at least one of a Matrox Imaging Library (MIL) blob analysis, an image calibration operation, an image edge finder algorithm, a geometric model finder algorithm measurement, metrology, or one or more pattern matching operations.

6. The method as claimed in claim 1, wherein the data and the template data comprise information related to at least one of edges or contours of the object and the one or more template objects.

7. A transformation identification computing device comprising at least one processor and a memory having stored thereon instructions that, when executed by the at least one processor, cause the at least one processor to perform steps comprising:
    receiving an input image of the object from one or more image sources;
    extracting data corresponding to a region of interest in the input image;
    comparing the extracted data with extracted template data corresponding to regions of interest present in one or more template images of one of one or more template objects, wherein the template data is extracted from a mark file of the one of one or more template objects that is created based on machine learning performed on the one or more template images;
    determining a transformation in a position of the object with respect to the position of the one of the one or more template objects, based on the comparison, wherein the transformation comprises at least one of a translation, a rotation, and a skew; and
    applying an inverse of the transformation to content data that is to be marked at a desired location within the region of interest of the object, wherein the inverse of the transformation is applied prior to marking the content data.

8. The transformation identification computing device as claimed in claim 7, wherein the instructions, when executed by the at least one processor, further cause the at least one processor to perform one or more additional steps comprising:
    realigning a laser head of a laser marking device associated with the transformation identification computing device based on the inverse of the transformation for marking the content data at the desired location.

9. The transformation identification computing device as claimed in claim 7, wherein the instructions, when executed by the at least one processor, further cause the at least one processor to perform one or more additional steps comprising obtaining the template data by:
    receiving the one or more template images of the one or more template objects along with the content data, wherein the content data comprises vectors and content attributes corresponding to a content to be marked on a surface of the template object;
    extracting the template data corresponding to the regions of interest, based on analysis of contours of each of the one or more template objects present in each of the one or more template images using one or more image processing algorithms; and storing the template data along with the content data in the mark file having a predefined format.

10. The transformation identification computing device as claimed in claim 9, wherein the instructions, when executed by the at least one processor, further cause the at least one processor to perform one or more additional steps comprising:

transmitting the mark file to a laser marking device associated with the transformation identification computing device for marking the content data on the object.

11. The transformation identification computing device as claimed in claim 9, wherein the image processing algorithms are based on at least one of a Matrox Imaging Library (MIL) blob analysis, an image calibration operation, an image edge finder algorithm, a geometric model finder algorithm measurement, metrology, or one or more pattern matching operations.

12. The transformation identification computing device as claimed in claim 7, wherein the data and the template data comprise information related to at least one of edges or contours of the object and the one or more template objects.

13. A non-transitory computer-readable medium having stored thereon instructions thereon for marking content on a surface of an object using a laser comprising executable code which, when executed by one or more processors, causes the one or more processors to perform steps comprising:

receiving an input image of the object from one or more image sources;

extracting data corresponding to a region of interest in the input image;

comparing the extracted data with extracted template data corresponding to regions of interest present in one or more template images of one of one or more template objects, wherein the template data is extracted from a mark file of the one of one or more template objects that is created based on machine learning performed on the one or more template images;

determining a transformation in a position of the object with respect to position of the one of the one or more template objects, based on the comparison, wherein the transformation comprises at least one of a translation, a rotation, and a skew; and applying an inverse of the transformation to content data that is to be marked at a desired location within the region of interest of the object, wherein the inverse of the transformation is applied prior to marking the content data.

14. The non-transitory computer-readable medium as claimed in claim 13, wherein the executable code, when executed by the one or more processors, further cause the one or more processors to perform one or more additional steps comprising:

realigning a laser head of a laser marking device associated with the transformation identification computing device based on the inverse of the transformation for marking the content data at the desired location.

15. The non-transitory computer-readable medium as claimed in claim 13, wherein the executable code, when executed by the one or more processors, further cause the one or more processors to perform one or more additional steps comprising obtaining the template data by:

receiving the one or more template images of the one or more template objects along with the content data, wherein the content data comprises vectors and content attributes corresponding to a content to be marked on a surface of the template object;

extracting the template data corresponding to the regions of interest, based on analysis of contours of each of the one or more template objects present in each of the one or more template images using one or more image processing algorithms; and storing the template data along with the content data in the mark file having a predefined format.

16. The non-transitory computer-readable medium as claimed in claim 15, wherein the executable code, when executed by the one or more processors, further cause the one or more processors to perform one or more additional steps comprising:

transmitting the mark file to a laser marking device for marking the content data on the object.

17. The non-transitory computer-readable medium as claimed in claim 15, wherein the image processing algorithms are based on at least one of a Matrox Imaging Library (MIL) blob analysis, an image calibration operation, an image edge finder algorithm, a geometric model finder algorithm measurement, metrology, or one or more pattern matching operations.

18. The non-transitory computer-readable medium as claimed in claim 7, wherein the data and the template data comprise information related to at least one of edges or contours of the object and the one or more template objects.

* * * * *